US008643901B2

(12) United States Patent
Yamaguchi

(10) Patent No.: US 8,643,901 B2
(45) Date of Patent: Feb. 4, 2014

(54) DETECTION APPARATUS AND METHOD, IMAGE FORMING APPARATUS, AND NON-TRANSITORY COMPUTER READABLE MEDIUM

(75) Inventor: Yoshiro Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 74 days.

(21) Appl. No.: 13/475,582

(22) Filed: May 18, 2012

(65) Prior Publication Data

US 2013/0120772 A1 May 16, 2013

(30) Foreign Application Priority Data

Nov. 10, 2011 (JP) ................................ 2011-246540

(51) Int. Cl.
*G06K 15/02* (2006.01)
*G06K 9/36* (2006.01)

(52) U.S. Cl.
USPC ............ 358/1.9; 358/1.2; 358/1.14; 347/116; 399/165; 399/302

(58) Field of Classification Search
USPC ................... 358/1.1, 1.2, 1.5, 1.9, 1.14, 1.18; 399/24, 49, 162, 165, 167, 301, 302, 399/303, 308; 382/286; 347/116
See application file for complete search history.

(56) References Cited

U.S. PATENT DOCUMENTS 5,754,932 A * 5/1998 Tahara .......................... 399/303
5,768,671 A * 6/1998 Komiya et al. ............... 399/301
6,134,022 A * 10/2000 Yamamoto et al. ............ 358/1.9
6,408,156 B1 * 6/2002 Miyazaki et al. ............. 399/301
7,291,855 B1 * 11/2007 Mihara et al. ................. 356/614
2005/0008406 A1 * 1/2005 Nishizaki ...................... 399/301
2007/0216912 A1 * 9/2007 Mihara ......................... 356/614
2009/0180805 A1 * 7/2009 Nakura et al. ................ 399/165
2011/0200343 A1 * 8/2011 Matsumoto et al. .......... 399/302
2012/0257915 A1 * 10/2012 Nakura et al. ................ 399/388

FOREIGN PATENT DOCUMENTS

JP 2000-009451 A 1/2000
JP 2005-257847 A 9/2005
JP 2006-259637 A 9/2006
JP 2007-192999 A 8/2007
JP 2009048049 A * 3/2009

* cited by examiner

*Primary Examiner* — Kimberly A Williams
(74) *Attorney, Agent, or Firm* — Sughrue Mion, PLLC

(57) ABSTRACT

A detection apparatus includes the following elements. A first measuring unit measures, from a binary image, density levels of first and second regions which are alternately arranged in a first direction in the binary image, the binary image being disposed on a second surface of a holding member which includes a first surface and the second surface. A storage unit stores therein information indicating an association between a distance from the first measuring unit to the second surface and a contrast between the adjacent first and second regions. A calculator calculates a contrast between the adjacent first and second regions. A detector specifies a distance corresponding to the calculated contrast by using the stored information, and detects a deflection of the holding member in the first direction by using the specified distance as the distance from the second surface to the adjacent first and second regions.

10 Claims, 9 Drawing Sheets

DETECTION APPARATUS AND METHOD, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-246540 filed Nov. 10, 2011.

BACKGROUND (i) Technical Field

The present invention relates to a detection apparatus and method, an image forming apparatus, and a non-transitory computer readable program.

(ii) Related Art

Techniques for detecting the state of an image forming apparatus or the state of media used for image formation in order to perform high-precision image formation are known.

SUMMARY

According to an aspect of the invention, there is provided a detection apparatus including: a first measuring unit that measures, from a binary image, density levels of first regions having a first grayscale value and density levels of second regions having a second grayscale value, the first regions and the second regions being alternately arranged in a first direction in the binary image, the binary image being disposed on a second surface of a holding member, the holding member including a first surface and the second surface provided opposite the first surface; a storage unit that stores, in the storage unit, information indicating an association between a distance from the first measuring unit to the second surface and a contrast between the first region and the second region positioned adjacent to each other obtained as a result of the first measuring unit measuring the density levels; a calculator that calculates a contrast between the first region and the second region positioned adjacent to each other by using the density level of the first region and the density level of the second region measured by the first measuring unit; and a detector that specifies a distance corresponding to the contrast calculated by the calculator by using the information stored in the storage unit, and detects a deflection of the holding member in the first direction by using the specified distance as the distance from the second surface to the first region and the second region positioned adjacent to each other.

BRIEF DESCRIPTION OF THE DRAWINGS

An exemplary embodiment of the present invention will be described in detail based on the following figures, wherein.

DETAILED DESCRIPTION

1. Configuration

Figure 1:
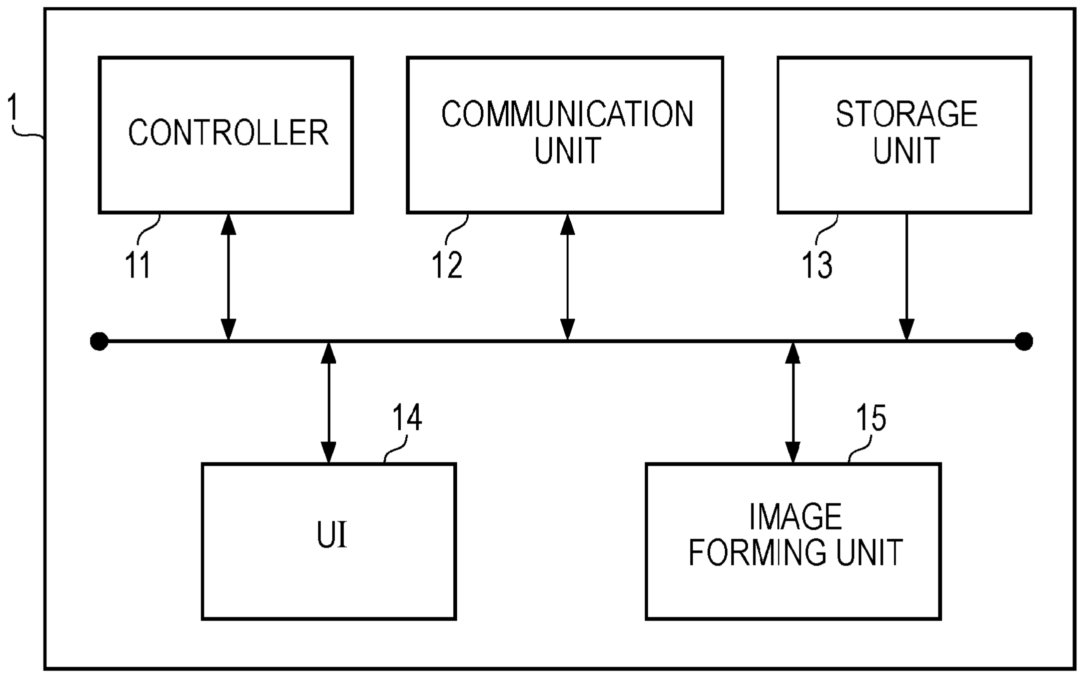
FIG. 1 is a block diagram illustrating an example of the configuration of an image forming apparatus according to an exemplary embodiment.

FIG. 1 illustrates an example of the configuration of an image forming apparatus 1 according to an exemplary embodiment. The image forming apparatus 1 includes a controller 11, a communication unit 12, a storage unit 13, a user interface (UI) 14, and an image forming unit 15. The controller 11 controls the individual components of the image forming apparatus 1. The controller 11 includes, for example, a central processing unit (CPU) and a memory. The CPU implements the functions of the controller 11 by executing a program stored in the memory. The communication unit 12 is a communication interface connected to a communication line. The image forming apparatus 1 performs communication with a client apparatus (not shown) by using the communication unit 12. The storage unit 13 is a storage device, such as a hard disk or a flash memory. The UI 14 includes, for example, a touch screen and keys, and is used for operating the image forming apparatus 1. The image forming unit 15 forms images represented by image data on a medium, such as paper, according to an electrophotographic system.

Figure 2:
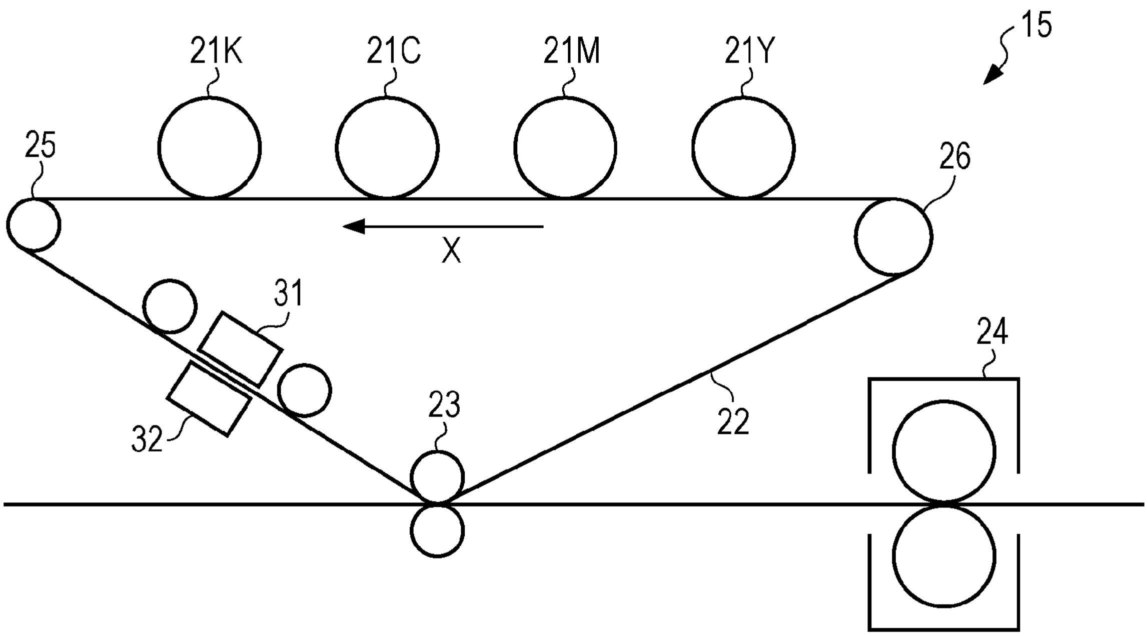
FIG. 2 illustrates an example of the configuration of an image forming unit.

FIG. 2 illustrates an example of the configuration of the image forming unit 15. The image forming unit 15 includes image forming engines 21Y, 21M, 21C, and 21K, an intermediate transfer belt 22, a second transfer roller 23, and a fixing unit 24. The image forming engines 21Y, 21M, 21C, and 21K each include a photoconductor, a charging device, an exposure device, a developing device, and a first transfer roller. In FIG. 2, among such components, components other than the photoconductors are not shown. The photoconductors are cylindrical members having photoconductive films on the surface, and rotate around the axis. The charging devices uniformly charge the surfaces of the photoconductors. The exposure devices irradiate the charged photoconductors with laser light in accordance with an image signal supplied from the controller 11, thereby forming electrostatic latent images on the photoconductors. The developing devices cause toner to adhere to the electrostatic latent images formed on the photoconductors, thereby forming toner images on the photoconductors. The developing devices of the image forming engines 21Y, 21M, 21C, and 21K form toner images of yellow, magenta, cyan, and black, respectively. The first transfer rollers transfer the toner images formed on the photoconductors onto the intermediate transfer belt 22. In this example, in the intermediate transfer belt 22, the surface on which images are transferred is called a front surface (an example of a first surface), while the surface provided opposite the front surface is called a back surface (an example of a second surface).

The intermediate transfer belt 22 (an example of a holding member) transports toner images which have been transferred on the intermediate transfer belt 22 by using the first transfer rollers to the second transfer roller 23. The intermediate transfer belt 22 is supported by plural rollers including a tension roller 25 and a driving roller 26. The driving roller 26 drives the intermediate transfer belt 22 in the X direction indicated by the arrow in FIG. 2. The tension roller 25 (an example of a support member) adjusts tension of the intermediate transfer belt 22. The second transfer roller 23 transfers images transported by the intermediate transfer belt 22 onto a medium, such as paper. The fixing device 24 heats and pressurizes the medium on which the images are transferred and fixes the images on the medium. The medium passing through the fixing device 24 is discharged from the image forming apparatus 1.

Figure 3:
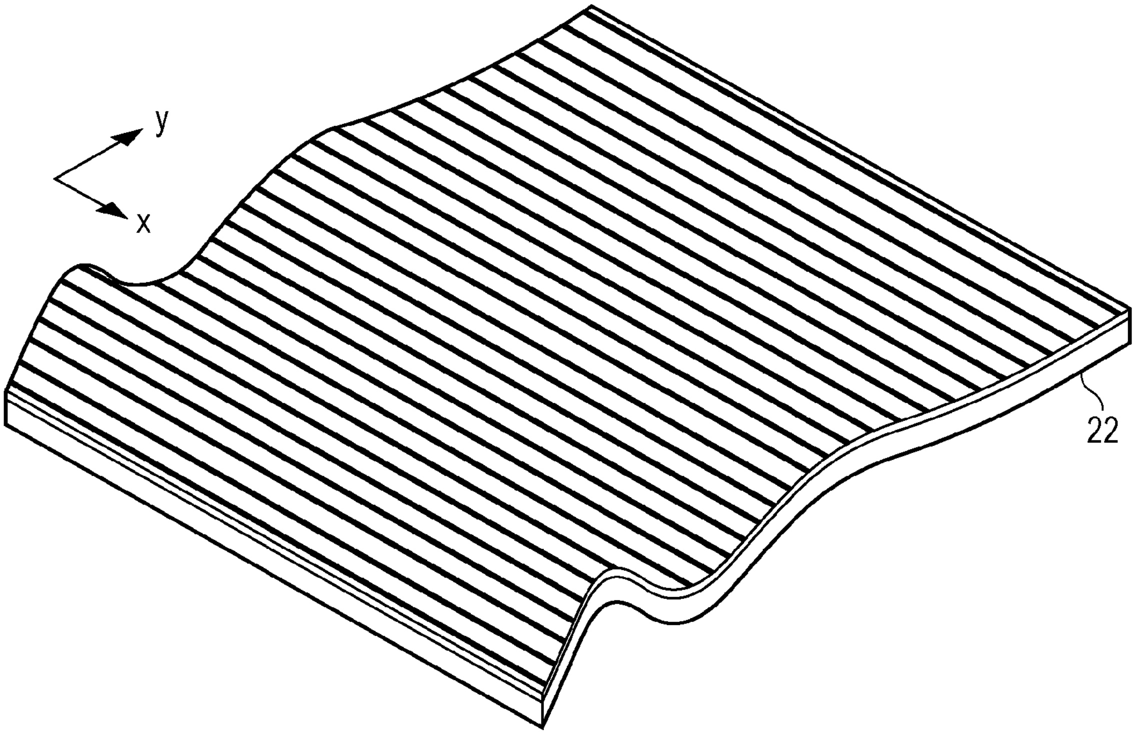
FIG. 3 illustrates the back surface of an intermediate transfer belt.

FIG. 3 illustrates the back surface of the intermediate transfer belt 22. A medium on which a ladder pattern chart (an example of a binary image) is printed is attached to the back surface of the intermediate transfer belt 22. The ladder pattern chart is an image generated by alternately arranging black and white narrow lines in parallel. The white narrow line region (hereinafter referred to as the "white region") is an example of a first region having a first grayscale value. The black narrow line region (hereinafter referred to as the "black region") is an example of a second region having a second grayscale value. The medium on which the latter pattern chart is printed is attached to the back surface of the intermediate transfer belt 22 in the direction in which the lines intersect with the widthwise direction (Y direction in FIG. 3) of the intermediate transfer belt 22. In this manner, the ladder pattern chart is formed on the back surface of the intermediate transfer belt 22.

Figure 4:
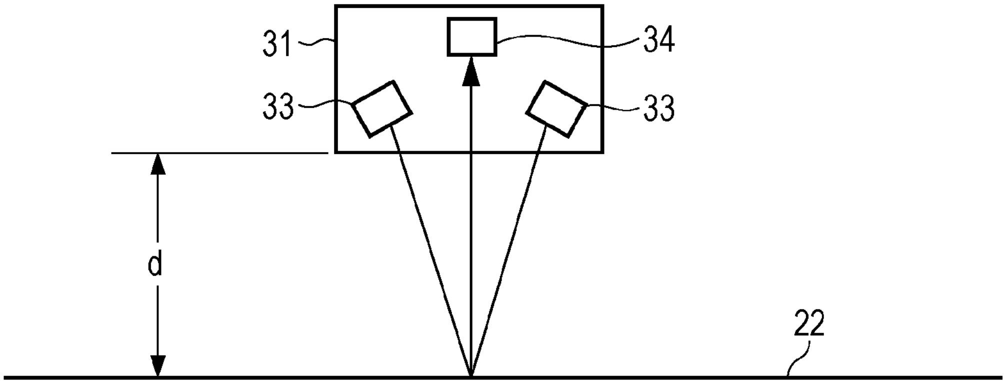
FIG. 4 illustrates an example of the configuration of a first image sensor.

A first image sensor 31 (an example of a first measuring unit) and a second image sensor 32 (an example of a second measuring unit) are disposed such that they oppose each other with the intermediate transfer belt 22 therebetween. FIG. 4 illustrates an example of the configuration of the first image sensor 31. The first image sensor 31 is a contact image sensor that reads the ladder pattern chart formed on the back surface of the intermediate transfer belt 22. The lines of the ladder pattern chart coincide with the direction (X direction in FIG. 3) in which the intermediate transfer belt 22 is transferred. The first image sensor 31 is also a line sensor and detects a detection width corresponding to the width of the intermediate transfer belt 22. The first image sensor 31 is disposed such that the distance d between the first image sensor 31 and the back surface of the intermediate transfer belt 22 is a distance other than the focal length. In this exemplary embodiment, the first image sensor 31 is positioned such that the distance d between the first image sensor 31 and the back surface of the intermediate transfer belt 22 is greater than the focal length. The first image sensor 31 includes light emitting elements 33 and a light receiving element 34. The light emitting elements 33 apply light to the back surface of the intermediate transfer belt 22. The light receiving element 34 receives diffusion reflection light from the back surface of the intermediate transfer belt 22. The amount of light received by the light receiving element 34 is changed in accordance with the density of the ladder pattern chart. The first image sensor 31 measures the density of the ladder pattern chart by using the amount of light received by the light receiving element 34 and outputs a signal representing the measured density.

The second image sensor 32 is a contact image sensor that reads images formed on the front surface of the intermediate transfer belt 22. The second image sensor 32 is also a line sensor and reads a detection width corresponding to the width of the intermediate transfer belt 22. The second image sensor 32 is positioned such that the distance between the second image sensor 32 and the front surface of the intermediate transfer belt 22 is equal to the focal length. The configuration of the second image sensor 32 is the same as that of the first image sensor 31. The second image sensor 32 measures the density of an image by using the amount of light received by the light receiving element and outputs a signal representing the measured density.

Figure 5:
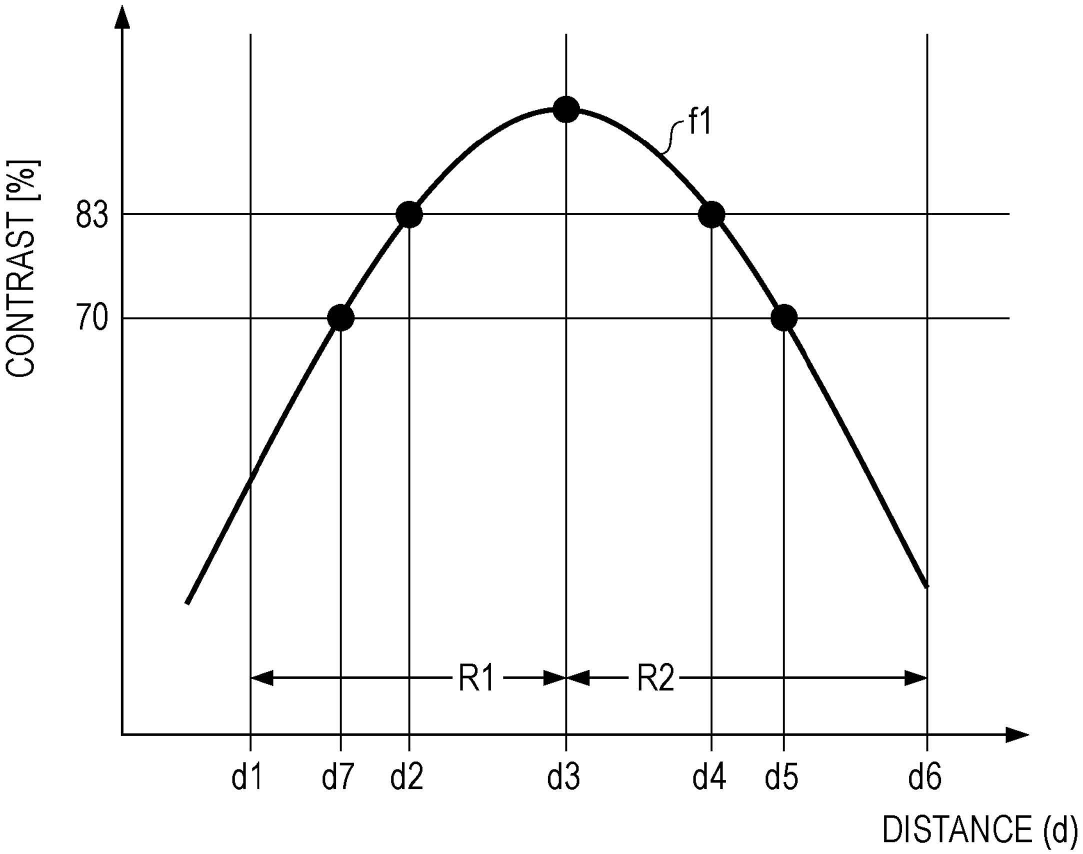
FIG. 5 is a graph illustrating a first function.

In the storage unit 13, a first function f1 is stored in advance. The first function f1 represents the association between the distance d from the first image sensor 31 to the back surface of the intermediate transfer belt 22 and the contrast of the ladder pattern chart obtained as a result of measurements performed by the first image sensor 31. The contrast is calculated in accordance with the density measured by the first image sensor 31 when the first image sensor 31 is separated from the back surface of the intermediate transfer belt 22 by the distance d. FIG. 5 illustrates a graph of the first function f1. The distance d1 shown in FIG. 5 is the lower limit distance between the first image sensor 31 and the back surface of the intermediate transfer belt 22. The distance d1 is set in consideration of, for example, a control system of the first image sensor 31 and limitations of the amount of light received by the first image sensor 31. The distance d6 shown in FIG. 5 is the upper limit distance between the first image sensor 31 and the back surface of the intermediate transfer belt 22. The distance d6 is set in consideration of, for example, the maximum resolution of the first image sensor 31. The distance d3 is the focal length of the first image sensor 31. According to the first function f1, when the distance d is the distance d3, the contrast becomes the highest, and as the distance d is farther away from the distance d3, the contrast becomes lower.

In the storage unit 13, a reference distance is also stored. The reference distance is a distance between the first image sensor 31 and the back surface of the intermediate transfer belt 22 when there is no occurrence of deflection in the intermediate transfer belt 22. In this example, assume that the reference distance is the distance d5 shown in FIG. 5. The state in which there is "no occurrence of deflection" is not necessarily a state in which no deflection occurs whatsoever, but may be a state in which the amount of deflection is equal to or less than a threshold.

Figure 6:
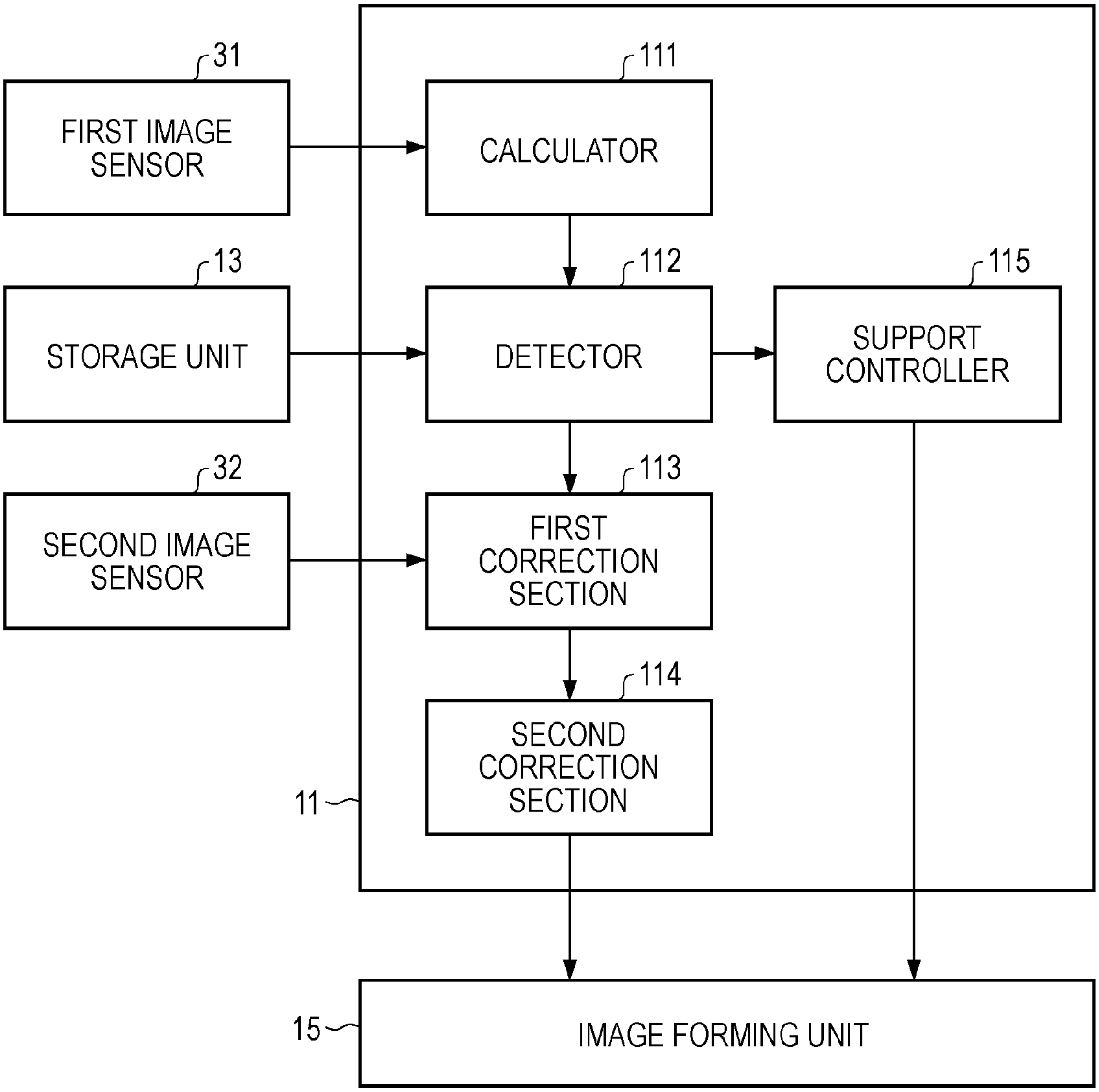
FIG. 6 illustrates the functional configuration of a controller.

FIG. 6 illustrates the functional configuration of the controller 11. The controller 11 includes a calculator 111, a detector 112, a first correction section 113, a second correction section 114, and a support controller 115. In this exemplary embodiment, those components are implemented by, for example, executing a program by the CPU. The first image sensor 31 measures the density of the black region and the density of the white region on the ladder pattern chart on which the black and white narrow lines are alternately arranged in the widthwise direction of the intermediate transfer belt 22. At this time, the calculator 111 calculates the contrast between the black region and the white region adjacent to each other by using the density of the black region and the density of the white region measured by the first image sensor 31. The detector 112 specifies the distance corresponding to the contrast calculated by the calculator 111 by using the function f1 stored in the storage unit 13. The detector 112 then sets the specified distance as the distance from the adjacent black and white regions to the back surface of the intermediate transfer belt 22, thereby detecting deflection in the widthwise direction of the intermediate transfer belt 22. The first correction section 113 corrects for errors caused by a change in the distance included in the density distribution of a test chart (which will be discussed later) measured by the second image sensor 32, in accordance with the state of the deflection detected by the detector 112. The second correction section 114 corrects for the density of an image to be formed by the image forming unit 15 in accordance with the density distribution of the test chart which has been corrected by the first correction section 113. The support controller 115 controls the position or the angle of the tension roller 25 so as to reduce the deflection detected by the detector 112.

2. Operation

Figure 7:
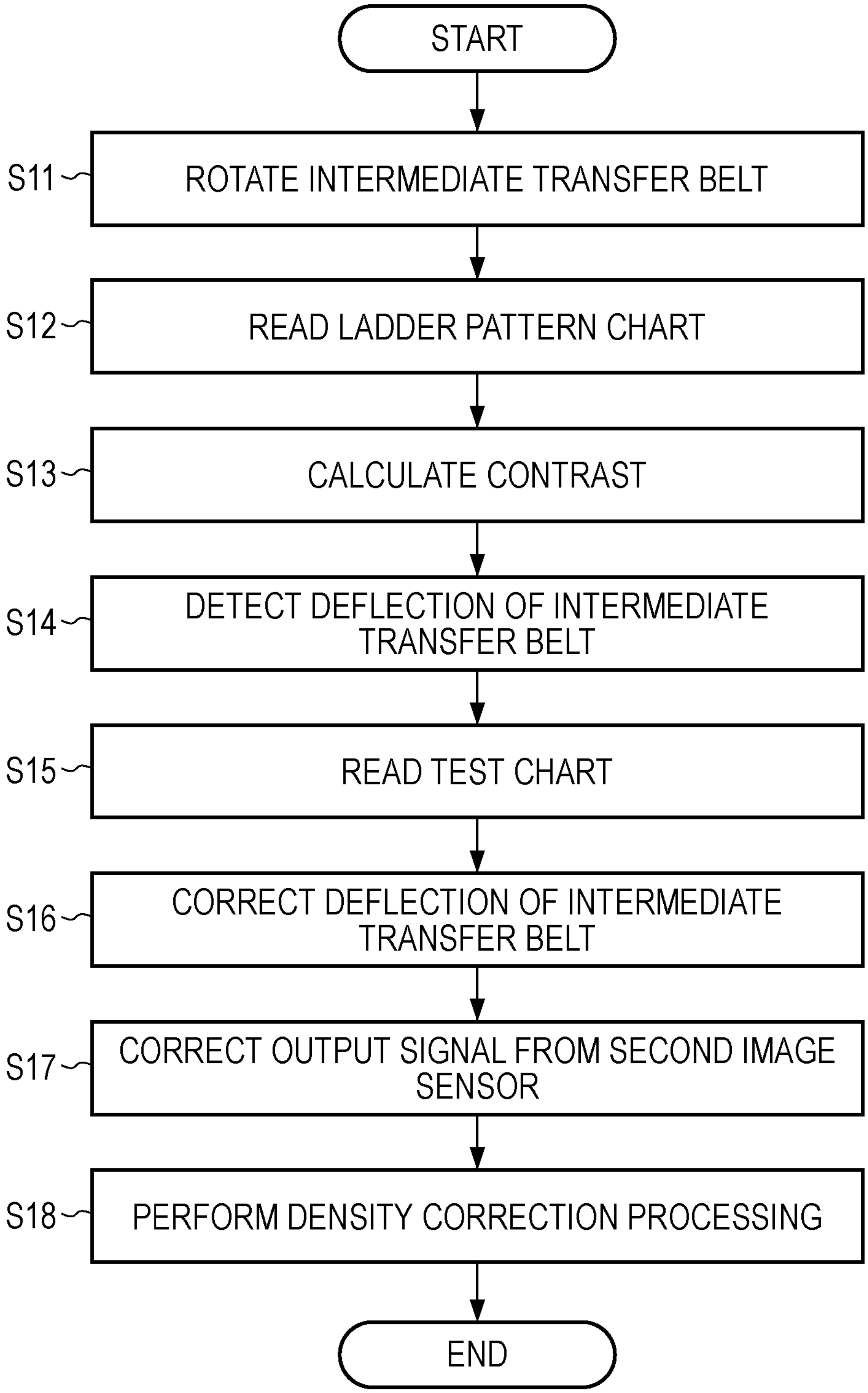
FIG. 7 is a flowchart illustrating an operation according to an exemplary embodiment.

In the image forming apparatus 1, density correction processing is performed by using a test chart. The test chart is an image used for correcting density levels of individual colors. The test chart has a predetermined density distribution. The test chart includes density patches of, for example, yellow, magenta, cyan, and black. FIG. 7 is a flowchart illustrating an operation when forming a test chart.

In step S11, the controller 11 drives the intermediate transfer belt 22 to rotate by using the driving roller 26. In step S12, the first image sensor 31 reads the ladder pattern chart formed on the back surface of the intermediate transfer belt 22. More specifically, the first image sensor 31 irradiates the back surface of the intermediate transfer belt 22 with laser light by using the light emitting elements 33 and receives light reflected by the ladder pattern chart by using the light receiving element 34. The first image sensor 31 measures the density for each of the lines contained in the ladder pattern chart by using the amount of light received by the light receiving element 34, and outputs a signal representing the measured density. As shown in FIG. 3, on the ladder pattern chart, black and white narrow lines are alternately arranged in the widthwise direction (Y direction) of the intermediate transfer belt 22. Accordingly, the first image sensor 31 measures the density of the black region and the density of the white region in the widthwise direction of the intermediate transfer belt 22, and outputs a signal representing the measured density levels.

In step S13, the controller 11 calculates the contrast of the ladder pattern chart on the basis of the signal output from the first image sensor 31. More specifically, for each pair of black and white narrow lines contained in the ladder pattern chart, the controller 11 calculates the contrast between the white line and the black line adjacent to each other. The contrast is the density difference between the black region and the white region. Assume that, for example, the output of the first image sensor 31 is 10 bits (1024 steps). In this case, if the grayscale value of the black region and the grayscale value of the white region measured by the first image sensor 31 are 900 and 50, respectively, the contrast is (900-50)/1024×100=83%.

In step S14, the controller 11 measures the distance d corresponding to the contrast calculated in step S13 by using the first function f1 stored in the storage unit 13, and detects an amount of deflection in the widthwise direction of the intermediate transfer belt 22 from the measured distance d. For example, if the contrast is calculated to 83% in step S13, the distance d corresponding to the contrast 83% is the distance d2 or the distance d4 according to the first function f1 shown in FIG. 5. The reference distance d5 stored in the storage unit 13 is greater than the distance d3. In this case, the controller 11 uses a value in a range R2 of the first function f1 in which the distance d increases from the distance d3. Thus, out of the distance d2 and the distance d4 corresponding to the contrast 83%, the controller 11 specifies the distance d4 contained in the range R2. In this manner, the controller 11 measures the distance d for each of the contrast values calculated in step S13. The controller 11 then sets the measured distance d corresponding to a certain contrast value as the distance from a pair of adjacent black and white lines exhibiting the certain contrast value to the back surface of the intermediate transfer belt 22, thereby detecting an amount of deflection in the widthwise direction of the intermediate transfer belt 22 on the basis of the reference distance d5 stored in the storage unit 13. Deflection in the widthwise direction is a state in which, when the intermediate transfer belt 22 is cut in the widthwise direction, as shown in FIG. 3, the cross section is wavy in a vertical direction.

Figure 8:
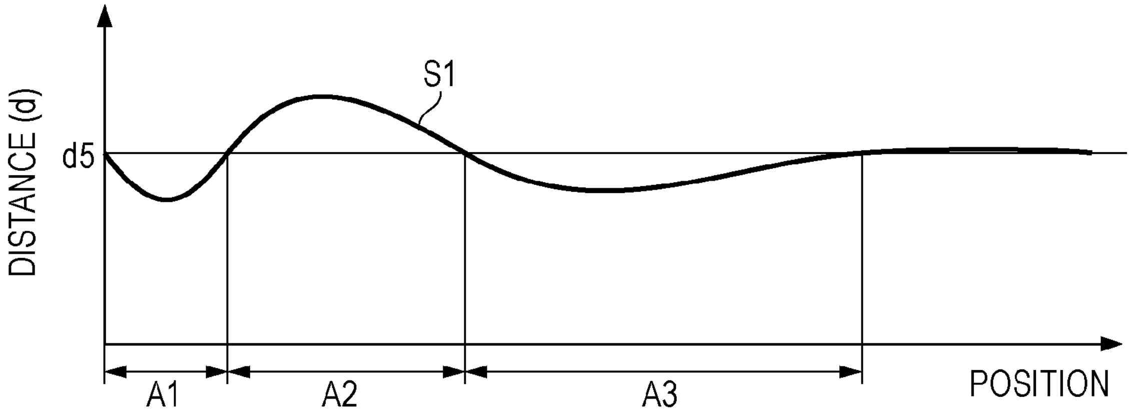
FIG. 8 illustrates an example of a measured distance.

If, for example, all the distances d measured in step S14 are equal to the reference distance d5, it means that there is no occurrence of deflection along the intermediate transfer belt 22. In contrast, if a distance d different from the reference distance d5 is contained in the distances d measured in step S14, deflection is occurring in that portion of the intermediate transfer belt 22. FIG. 8 illustrates the distance d measured in step S14. The horizontal axis in FIG. 8 indicates the position of the intermediate transfer belt 22 in the widthwise direction. In a region A1 and a region A3 in FIG. 8, the distance d measured in step S14 is smaller than the reference distance d5. This is because the regions A1 and A3 of the intermediate transfer belt 22 deflect in the direction in which the regions A1 and A3 are closer to the first image sensor 31. In contrast, in a region A2, the distance d measured in step S14 is greater than the reference distance d5. This is because the region A2 of the intermediate transfer belt 22 deflects in the direction in which the region A2 is farther away from the first image sensor 31.

After step S11, the image forming engines 21Y, 21M, 21C, and 21K form a test chart on the front surface of the intermediate transfer belt 22. In step S15, the second image sensor 32 reads the test chart formed on the front surface of the intermediate transfer belt 22. More specifically, the second image sensor 32 irradiates the front surface of the intermediate transfer belt 22 with laser light by using the light emitting elements, and receives light reflected by the test chart formed on the front surface of the intermediate transfer belt 22 by using the light receiving element. The second image sensor 32 measures the density of the test chart by using the amount of light received by the light receiving element, and outputs a signal representing the measured density. Since the second image sensor 32 is a contact image sensor, the depth of focus is small. Accordingly, if deflection occurs in the intermediate transfer belt 22 so as to change the distance between the second image sensor 32 and the intermediate transfer belt 22, laser light is not in focus on the intermediate transfer belt 22, thereby generating errors in the density measurements.

In step S16, upon the occurrence of deflection in the intermediate transfer belt 22, the controller 11 controls the position or the angle of the tension roller 25 so that an amount of deflection is corrected. The meaning of "correction" or "corrected" includes, not only completely eliminating deflection, but also reducing the amount of deflection. For example, the controller 11 shifts the position of the tension roller 25 in a direction in which tension of the intermediate transfer belt 22 increases. Alternatively, the controller 11 tilts the tension roller 25 in a direction in which the deflection of the intermediate transfer belt 22 is corrected. As a result, the deflection of the intermediate transfer belt 22 is corrected, and the distance d between the first image sensor 31 and the back surface of the intermediate transfer belt 22 is returned to the reference distance d5.

If deflection occurs in the intermediate transfer belt 22, in step S17, the controller 11 corrects a signal output from the second image sensor 32 in accordance with the state of deflection of the intermediate transfer belt 22 detected in step S14.

Figure 9:
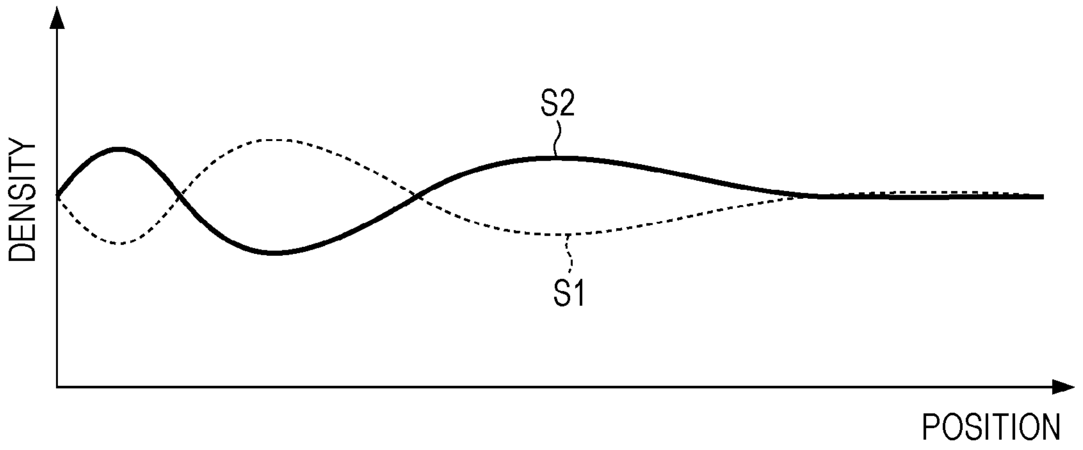
FIG. 9 illustrates an example of a signal output from a second image sensor.

For example, if the distance d which changes as shown in FIG. 8 is measured in step S14, the controller 11 generates a signal S1 representing the distribution of the distances d measured in step S14. The distance d measured in step S14 is the distance between the first image sensor 31 and the back surface of the intermediate transfer belt 22. Accordingly, the distance between the second image sensor 32 and the front surface of the intermediate transfer belt 22 is reverse to the distance d measured in step S14. For example, if the distance d measured in step S14 is decreased, the distance between the second image sensor 32 and the front surface of the intermediate transfer belt 22 increases. Conversely, if the distance d is increased, the distance between the second image sensor 32 and the front surface of the intermediate transfer belt 22 decreases. Accordingly, a signal S2 output from the second image sensor 32 is inverted from the signal S1, as shown in FIG. 9. That is, the signals S1 and S2 are influenced by the distance d in opposite directions. In order to cancel out the influences of the distance d with each other, the controller 11 multiplies the signal S2 output from the second image sensor 32 with the signal S1, thereby correcting for errors caused by a change in the distance between the second image sensor 32 and the front surface of the intermediate transfer belt 22.

Then, when forming an image specified by a user, in step S18, the controller 11 performs density correction processing in accordance with a signal corrected in step S17. More specifically, the controller 11 generates a density distribution of the test chart by using the signal corrected in step S17. The controller 11 corrects the density of an image to be formed by each of the image forming engines 21Y, 21M, 21C, and 21K so that the density nonuniformity and streaks contained in the generated density distribution can be reduced. For example, the controller 11 corrects the grayscale value represented by an image signal to be supplied to each exposure device by using a lookup table.

In this exemplary embodiment, the distance d between the first image sensor 31 and the back surface of the intermediate transfer belt 22 is uniquely specified, thereby detecting deflection in the widthwise direction of the intermediate transfer belt 22. Additionally, density correction processing is performed on the basis of the signal which has been corrected for errors caused by a change in the distance between the second image sensor 32 and the front surface of the intermediate transfer belt 22, thereby improving the precision in density correction processing. The position or the angle of the tension roller 25 is also controlled, thereby reducing deflection in the intermediate transfer belt 22.

3. Modified Examples

The above-described exemplary embodiment is only an example of the present invention. Alternatively, the present invention may be modified as follows, or the following modified examples may be combined.

(1) First Modified Example

The first image sensor 31 may be disposed at a position at which the distance d between the first image sensor 31 and the back surface of the intermediate transfer belt 22 is smaller than the focal length. In this case, the controller 11 utilizes a value in the range R1 of the first function f1 in which the distance decreases from the focal length d3. Accordingly, if the contrast is calculated to 83% in step S13, the controller 11 specifies the distance d2 contained in the range R1, out of the distance d2 and the distance d4 corresponding to the contrast 83% in the first function f1. That is, when the first image sensor 31 is disposed at a position at which the distance between the first image sensor 31 and the back surface of the intermediate transfer belt 22 is greater than the focal length, a value in the range of the first function f1 in which the distance d increases from a value equal to the focal length is utilized. In contrast, when the first image sensor 31 is disposed at a position at which the distance between the first image sensor 31 and the back surface of the intermediate transfer belt 22 is smaller than the focal length, a value in the range of the first function f1 in which the distance d decreases from the focal length is utilized.

(2) Second Modified Example

In the above-described exemplary embodiment, in step S14, the controller 11 determines which range of values of the function f1 is to be utilized, on the basis of the reference distance, and thereby uniquely specifies the distance d between the first image sensor 31 and the back surface of the intermediate transfer belt 22. However, instead of using the reference distance, the distance d may be directly measured.

In this modified example, the first image sensor 31 may be disposed at a position at which the distance between the first image sensor 31 and the back surface of the intermediate transfer belt 22 is greater than the focal length, or at a position at which the above-described distance is smaller than the focal length. In the storage unit 13, a reference contrast and a reference amount of light are stored in advance. The reference contrast is a contrast calculated by using the density measured by the first image sensor 31 when there is no occurrence of deflection in the intermediate transfer belt 22. Assume that the reference contrast is 70%. The reference amount of light is the amount of light received by the first image sensor 31 when there is no occurrence of deflection in the intermediate transfer belt 22. The meaning of the state in which there is "no occurrence of deflection" is not necessarily a state in which no deflection occurs whatsoever, but may be a state in which the amount of deflection is equal to or less than a threshold.

In step S14, the controller 11 first specifies, by using the function f1, the distance d corresponding to the contrast calculated in step S13. For example, if the contrast is calculated to 83% in step S13, the controller 11 specifies the distance d2 and the distance d4 corresponding to the reference contrast 70% in the first function f1 shown in FIG. 5. Then, the controller 11 specifies the distance d corresponding to the reference contrast 70% stored in the storage unit 13. In the first function f1 shown in FIG. 5, the distance d5 and the distance d7 corresponding to the reference contrast 70% are specified. If the reference distance of the first image sensor 31 is the distance d7, it means that the distance d between the first image sensor 31 and the back surface of the intermediate transfer belt 22 has increased from the distance d7 to the distance d2. In contrast, if the reference distance of the first image sensor 31 is the distance d5, it means that the distance d between the first image sensor 31 and the back surface of the intermediate transfer belt 22 has decreased from the distance d5 to the distance d4.

Figure 10:
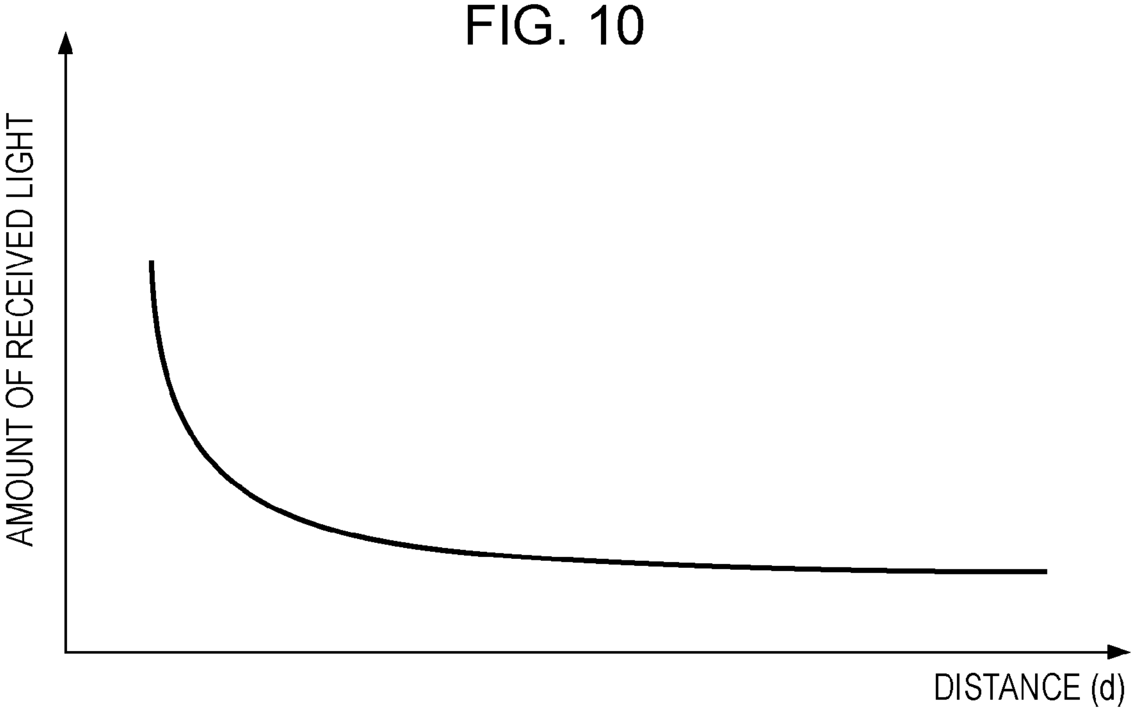
FIG. 10 illustrates the association between the amount of received light and the distance according to a modified example.

Then, the controller 11 compares the amount of light received by the first image sensor 31 in step S12 with the reference amount of light stored in the storage unit 13, and determines whether the distance d has been increased. As shown in FIG. 10, as the distance d between the first image sensor 31 and the back surface of the intermediate transfer belt 22 increases, the amount of light received by the first image sensor 31 decreases. Accordingly, when the amount of light received by the first image sensor 31 is larger than the reference amount of light, the controller 11 determines that the distance d has decreased. In this case, the distance d between the first image sensor 31 and the back surface of the intermediate transfer belt 22 may have been changed from the distance d5 to the distance d4. Thus, the controller 11 specifies the distance d4. Conversely, when the amount of light received by the first image sensor 31 is smaller than the reference amount of light, the controller 11 determines that the distance d has increased. In this case, the distance d between the first image sensor 31 and the back surface of the intermediate transfer belt 22 may have been changed from the distance d7 to the distance d2. Thus, the controller 11 specifies the distance d2.

In this manner, when the contrast calculated in step S13 is higher than the reference contrast, the controller 11 specifies the distance d as follows. When the amount of light received by the first image sensor 31 is larger than the reference amount of light, the controller 11 specifies the distance d between the first image sensor 31 and the back surface of the intermediate transfer belt 22 by using a value in the range R2 of the first function f1 in which the distance d increases from the focal length d3. In contrast, when the amount of light received by the first image sensor 31 is smaller than the reference amount of light, the controller 11 specifies the distance d between the first image sensor 31 and the back surface of the intermediate transfer belt 22 by using a value in the range R1 in which the distance d decreases than the focal length d3 in the first function f1.

If the contrast calculated in step S13 is lower than the reference contrast, the controller 11 specifies the distance d in a manner opposite to that when the contrast is higher than the reference contrast. More specifically, when the amount of light received by the first image sensor 31 is larger than the reference amount of light, the controller 11 utilizes a value in the range R1 of the first function f1 in which the distance d decreases from the focal length d3. When the amount of light received by the first image sensor 31 is smaller than the reference amount of light, the controller 11 utilizes a value in the range R2 of the first function f1 in which the distance d increases from the focal length d3.

(3) Third Modified Example

The first image sensor 31 may measure plural density levels for each line contained in the ladder pattern chart. In this case, in step S13, the controller 11 calculates contrast corresponding to the density levels measured in step S12. The contrast corresponding to the density levels may be the average of the plural density levels, and may be the median or the mode of the density levels. If the average is to be utilized, the controller 11 may extract the peak value from the plural density levels, sequentially select a predetermined number of density levels in descending order from the peak value, and take the average of the selected number of peak values.

(4) Fourth Modified Example

Figure 11:
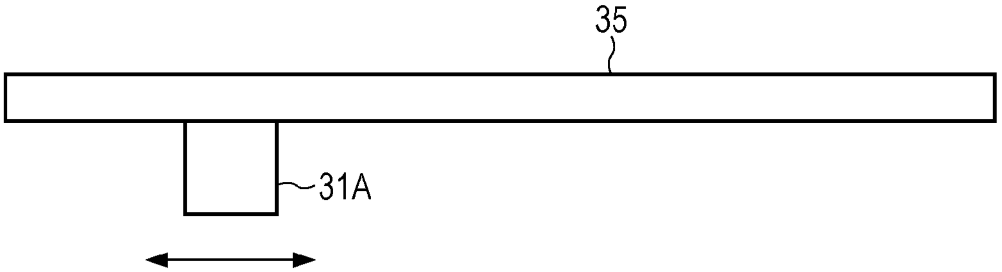
FIG. 11 illustrates an example of the configuration of a first image sensor according to a modified example.

The first image sensor 31 is not restricted to a line sensor. The first image sensor 31 may be a spot laser sensor that reads images by utilizing spot light. FIG. 11 illustrates an example of the configuration of a first image sensor 31A of this modified example. The first image sensor 31A is moved along the width of the intermediate transfer belt 22 by a movement mechanism 35, thereby measuring the density of the ladder pattern chart in the widthwise direction of the intermediate transfer belt 22.

(5) Fifth Modified Example

In the above-described exemplary embodiment, the distance d between the first image sensor 31 and the back surface of the intermediate transfer belt 22 is measured by the use of the contrast of a ladder pattern chart. However, the distance d may be measured without using the contrast of a ladder pattern chart.

In this modified example, instead of the above-described ladder pattern chart, a white board is formed on the back surface of the intermediate transfer belt 22. More specifically, the back surface of the intermediate transfer belt 22 may be formed in white, or a white medium may be attached to the back surface of the intermediate transfer belt 22. Additionally, the first image sensor 31 may be disposed at a position at which the distance between the first image sensor 31 and the intermediate transfer belt 22 is equal to the focal length, or at which the above-described distance is greater or smaller than the focal length.

Figure 12:
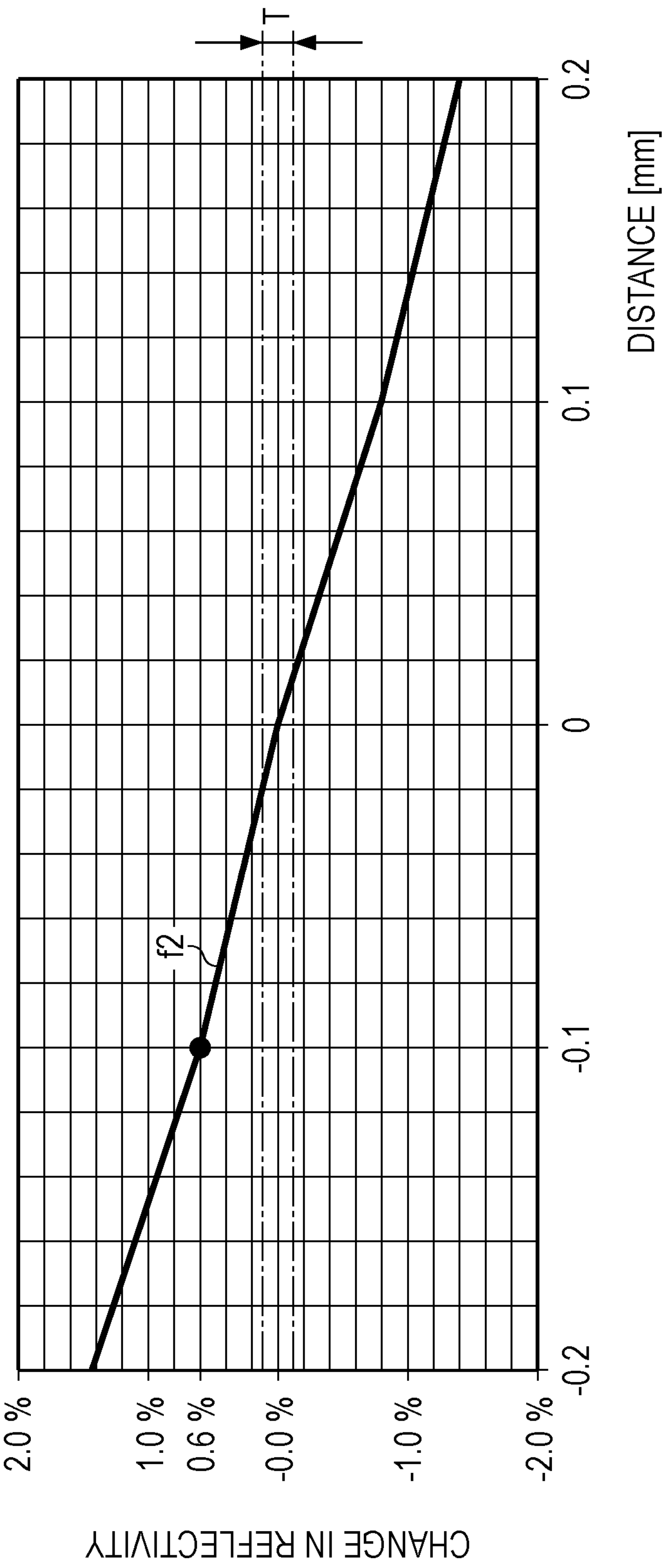
FIG. 12 is a graph illustrating a second function according to a modified example.

In the storage unit 13, a second function f2 is stored in advance. The second function f2 indicates the association between the distance d from the first image sensor 31 to the back surface of the intermediate transfer belt 22 and a change in the reflectivity of the white board formed on the back surface of the intermediate transfer belt 22. FIG. 12 is a graph illustrating the second function f2. When there is no occurrence of deflection in the intermediate transfer belt 22, a change in the reflectivity of the white board obtained as a result of the first image sensor 31 reading the white board is within a target range T. However, when the intermediate transfer belt 22 is deflected in the direction in which the intermediate transfer belt 22 is closer to the first image sensor 31, a change in the reflectivity exceeds the upper limit of the target range T. In contrast, when the intermediate transfer belt 22 is deflected in the direction in which the intermediate transfer belt 22 is farther away from the first image sensor 31, a change in the reflectivity becomes lower than the lower limit of the target range T.

Figure 13:
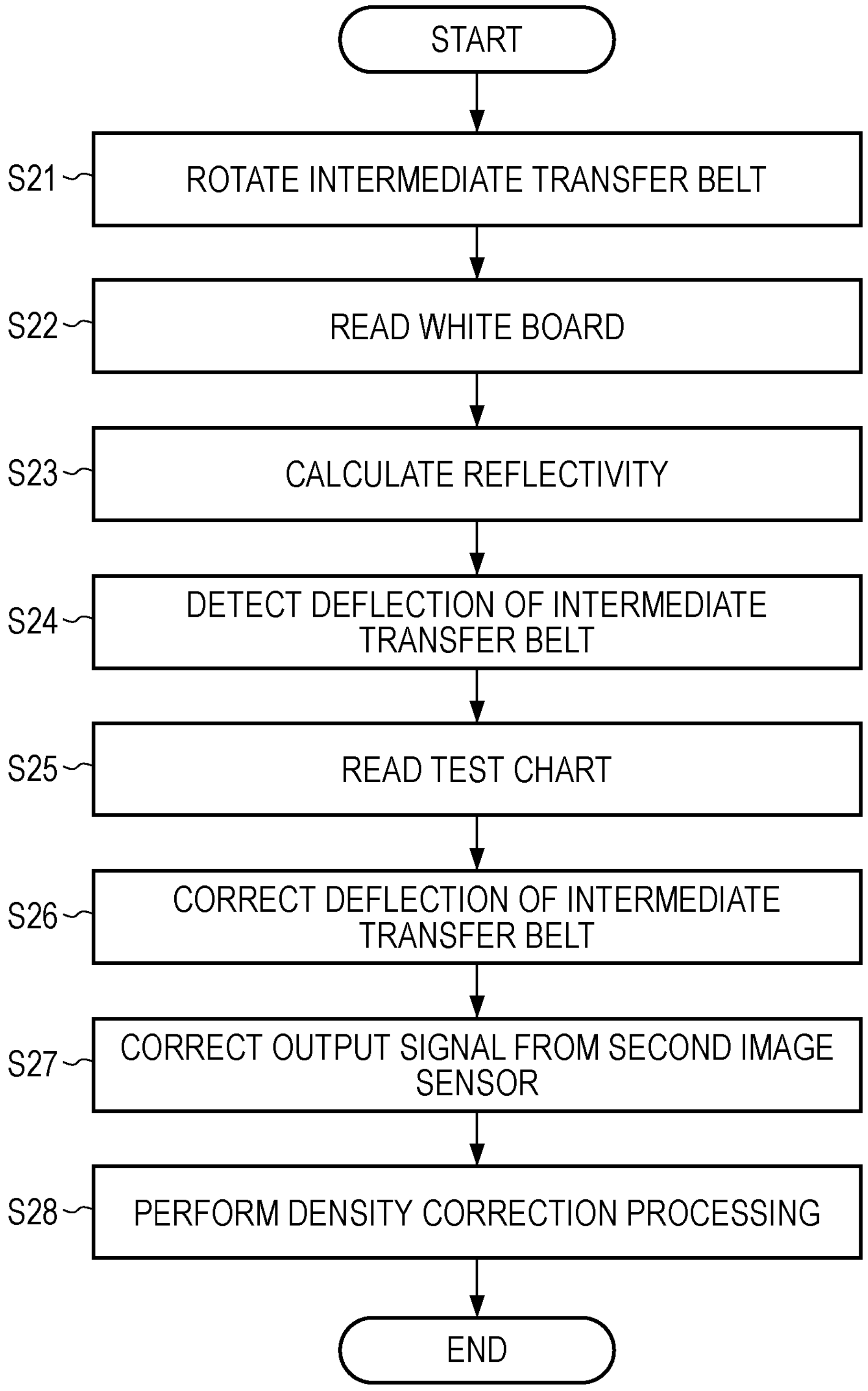
FIG. 13 is a flowchart illustrating an operation according to a modified example.

FIG. 13 is a flowchart illustrating the operation of this modified example. In step S21, as in step S11, the intermediate transfer belt 22 is driven and rotated. Then, in step S22, the first image sensor 31 reads the white board formed on the back surface of the intermediate transfer belt 22. More specifically, the first image sensor 31 irradiates the back surface of the intermediate transfer belt 22 with laser light by using the light emitting elements 33 and receives light reflected by the white board by using the light receiving element 34. The first image sensor 31 then outputs a signal representing the amount of received light.

In step S23, on the basis of the signal output from the first image sensor 31, the first image sensor 31 calculates the reflectivity values of plural regions of the white board in the widthwise direction of the intermediate transfer belt 22. The reflectivity is calculated by using the amount of light emitted from the light emitting elements 33 and the amount of light received by the light receiving element 34. In step S24, the controller 11 measures the distance d corresponding to a change in the reflectivity calculated in step S23 by utilizing the second function f2 stored in the storage unit 13, and detects the deflection of the intermediate transfer belt 22 from the measured distance d. For example, if a change in the reflectivity calculated in step S23 is 0.6% in the second function f2 shown in FIG. 12, the distance d deviating from the reference distance between the first image sensor 31 and the back surface of the intermediate transfer belt 22 by −0.1 mm is measured. This reveals that the region exhibiting this change in the reflectivity is deflected in the direction in which the intermediate transfer belt 22 is closer to the first image sensor 31. The controller 11 measures the distance d corresponding to each of the reflectivity values calculated in step S23. As a result, the amount of deflection in the widthwise direction of the intermediate transfer belt 22 is detected. Steps S25 through S28 are similar to steps S15 through S18, respectively, of FIG. 7.

(6) Sixth Modified Example

In the above-described exemplary embodiment, in the case of the occurrence of deflection in the intermediate transfer belt 22, processing for correcting the deflection of the intermediate transfer belt 22 in step S16 and processing for correcting a signal output from the first image sensor 31 in step S17 are both performed. However, it is not always necessary that both of steps S16 and S17 be performed, and only processing for correcting the deflection of the intermediate transfer belt 22 may be performed. In this case, it is preferable that, after the deflection is corrected, a test chart is formed and read. Alternatively, only processing for correcting a signal output from the first image sensor 31 may be performed. Additionally, as a normal operation, only steps S11 through S14 and step S16 may be performed, and only when an instruction to form a test chart is given, may steps S1 through S18 be performed.

(7) Seventh Modified Example

In FIG. 2, the first image sensor 31 and the second image sensor 32 are disposed between the tension roller 25 and the second transfer roller 23. However, the position of the first and second image sensors 31 and 32 is not restricted to the above-described position. For example, the first and second image sensors 31 and 32 may be disposed between the image forming engine 21K and the tension roller 25. It is preferable that the first and second image sensors 31 and 32 be disposed at a position at which deflection is likely to occur in the intermediate transfer belt 22.

(8) Eighth Modified Example

In FIG. 3, the ladder pattern chart is formed on the entire back surface of the intermediate transfer belt 22. However, a ladder pattern chart does not have to be formed on the entire back surface of the intermediate transfer belt 22. For example, a ladder pattern chart does not have to be formed in an area of the intermediate transfer belt 22 where deflection is not likely to occur. Alternatively, a ladder pattern chart may be formed only in a target area of the intermediate transfer belt 22 where deflection is to be detected.

(9) Ninth Modified Example

In the above-described exemplary embodiment, the first function f1 is utilized as information indicating the association between the distance d from the first image sensor 31 to the back surface of the intermediate transfer belt 22 and the contrast of the ladder pattern chart read by the first image sensor 31. However, the information indicating the above-described association is not restricted to a function. For example, a table format indicating the association may be used.

(10) Tenth Modified Example

The type of ladder pattern chart is not restricted to the ladder pattern chart discussed in the exemplary embodiment. For example, the colors of the lines of the ladder pattern chart may be different from white and black, or two gray colors having different grayscale values may be used. Additionally, the intervals between the lines or the thickness of the lines may be different from those discussed in the exemplary embodiment, and lines of two colors do not have to be parallel. The pattern of the ladder pattern chart is not restricted to lines, but may be a different pattern, for example, a lattice pattern including black and white. That is, any type of ladder pattern chart may be used as long as it is an image from which contrast can be measured, i.e., a binary image on which first regions having a first grayscale value and second regions having a second grayscale value are alternately disposed.

The function of the test chart is not restricted to the correction of the color density. For example, the test chart may include images used for correcting color misalignment.

(11) Eleventh Modified Example

The first image sensor 31 or the second image sensor 32 is not restricted to a contact image sensor, and it may be any type of sensor as long as it exhibits characteristics that cause the measured contrast or the amount of received light to vary in accordance with the distance between the sensor and a subject irradiated with light.

(12) Twelfth Modified Example

The above-described controller 11, the storage unit 13, and the first image sensor 31 may be formed into a unit, and may be provided as a detection apparatus that detects deflection of the intermediate transfer belt 22. Such a detection apparatus may be used in an apparatus other than the image forming apparatus 1, for example, it may be used in a scanner.

(13) Thirteenth Modified Example

The program executed by the CPU of the controller 11 may be provided by being recorded in a recording medium, such as magnetic tape, a magnetic disk, a flexible disk, an optical disc, a magneto-optical disc, or a memory, and be installed into the image forming apparatus 1. Alternatively, the program may be downloaded into the image forming apparatus 1 via a communication line, such as the Internet.

The foregoing description of the exemplary embodiment and modified examples of the present invention has been provided for the purposes of illustration and description. It is not intended to be exhaustive or to limit the invention to the precise forms disclosed. Obviously, many modifications and variations will be apparent to practitioners skilled in the art. The embodiment and modified examples were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A detection apparatus comprising:

a first measuring unit that measures, from a binary image, density levels of first regions having a first grayscale value and density levels of second regions having a second grayscale value, the first regions and the second regions being alternately arranged in a first direction in the binary image, the binary image being disposed on a second surface of a holding member, the holding member including a first surface and the second surface provided opposite the first surface;

a storage unit that stores, in the storage unit, information indicating an association between a distance from the first measuring unit to the second surface and a contrast between the first region and the second region positioned adjacent to each other obtained as a result of the first measuring unit measuring the density levels;

a calculator that calculates a contrast between the first region and the second region positioned adjacent to each other by using the density level of the first region and the density level of the second region measured by the first measuring unit; and a detector that specifies a distance corresponding to the contrast calculated by the calculator by using the information stored in the storage unit, and detects a deflection of the holding member in the first direction by using the specified distance as the distance from the second surface to the first region and the second region positioned adjacent to each other.

2. The detection apparatus according to claim 1, wherein:

the first measuring unit is disposed at a position at which a distance between the first measuring unit and the second surface is greater than a focal length; and the detector specifies the distance by using a range in which the distance increases from a value equal to the focal length, the range being included in the information stored in the storage unit.

3. The detection apparatus according to claim 1, wherein a test chart including a predetermined density distribution is formed on the first surface of the holding member, the detection apparatus further comprising:

a second measuring unit that measures a density of a test chart;

a first correction unit that corrects, in accordance with a state of the deflection detected by the detector, errors caused by a change in the distance, the change in the distance being in the density distribution of the test chart measured by the second measuring unit; and a second correction unit that corrects a density of an image to be formed by an image forming unit in accordance with a density distribution of the test chart which has been corrected by the first correction unit.

4. The detection apparatus according to claim 2, wherein a test chart including a predetermined density distribution is formed on the first surface of the holding member, the detection apparatus further comprising:

a second measuring unit that measures a density of a test chart;

a first correction unit that corrects, in accordance with a state of the deflection detected by the detector, errors caused by a change in the distance, the change in the distance being in the density distribution of the test chart measured by the second measuring unit; and a second correction unit that corrects a density of an image to be formed by an image forming unit in accordance with a density distribution of the test chart which has been corrected by the first correction unit.

5. The detection apparatus according to claim 1, wherein:

the first measuring unit includes a light emitting element that irradiates the second surface with light and a light receiving element that receives light reflected by the second surface, and measures the density levels by using an amount of light received by the light receiving element;

the storage unit stores, as a reference contrast, the contrast between the first region and the second region positioned adjacent to each other obtained as a result of the first measuring unit measuring the density levels when the deflection of the holding member in the first direction is equal to or less than a threshold, and stores, as a reference amount of light, the amount of light received by the light receiving element that the first measuring unit uses to measure the density levels when the deflection of the holding member in the first direction is equal to or less than the threshold; and when the calculated contrast is higher than the reference contrast and when the amount of light received by the light receiving element is greater than the reference amount of light, the detector specifies the distance by using a range in which the distance increases from a value equal to the focal length of the first measuring unit, the range being included in the information stored in the storage unit, and when the calculated contrast is higher than the reference contrast and when the amount of light received by the light receiving element is smaller than the reference amount of light, the detector specifies the distance by using a range in which the distance decreases from the value equal to the focal length of the first measuring unit, the range being included in the information stored in the storage unit.

6. The detection apparatus according to claim 5, wherein when the calculated contrast is lower than the reference contrast and when the amount of light received by the light receiving element is greater than the reference amount of light, the detector specifies the distance by using a range in which the distance decreases from the value equal to the focal length of the first measuring unit, the range being included in the information stored in the storage unit, and when the calculated contrast is lower than the reference contrast and when the amount of light received by the light receiving element is smaller than the reference amount of light, the detector specifies the distance by using a range in which the distance increases from a value equal to the focal length of the first measuring unit, the range being included in the information stored in the storage unit.

7. An image forming apparatus comprising:

a holding member including a first surface and a second surface provided opposite the first surface, a binary image being disposed on the second surface, first regions having a first grayscale value and second regions having a second grayscale value being alternately arranged in a first direction in the binary image;

an image forming unit that forms an image on the first surface;

a first measuring unit that measures density levels of the first regions and density levels of the second regions;

a storage unit that stores, in the storage unit, information indicating an association between a distance from the first measuring unit to the second surface and a contrast between the first region and the second region positioned adjacent to each other obtained as a result of the first measuring unit measuring the density levels;

a calculator that calculates a contrast between the first region and the second region positioned adjacent to each other by using the density level of the first region and the density level of the second region measured by the first measuring unit; and a detector that specifies a distance corresponding to the contrast calculated by the calculator by using the information stored in the storage unit, and detects a deflection of the holding member in the first direction by using the specified distance as the distance from the second surface to the first region and the second region positioned adjacent to each other.

8. The image forming apparatus according to claim 7, further comprising:

a support member that supports the holding member; and a support controller that controls a position or an angle of the support member so that the deflection detected by the detector is reduced.

9. A detection method comprising:

calculating a contrast between a first region having a first grayscale value and a second region having a second grayscale value positioned adjacent to each other, the first region and the second region being alternately arranged in a first direction in a binary image, the binary image being disposed on a second surface of a holding member, the holding member including a first surface and the second surface provided opposite the first surface, the contrast being calculated by using a density level of the first region and a density level of the second region measured by a first measuring unit; and specifying a distance corresponding to the calculated contrast by using stored information indicating an association between a distance from the first measuring unit to the second surface and the contrast between the first region and the second region positioned adjacent to each other obtained as a result of the first measuring unit measuring the density levels, and detecting a deflection of the holding member in the first direction by using the specified distance as the distance from the second surface to the first region and the second region positioned adjacent to each other.

10. A non-transitory computer readable medium storing a program causing a computer to execute a process, the computer including a first measuring unit that measures, from a binary image, density levels of first regions having a first grayscale value and density levels of second regions having a second grayscale value, the first regions and the second regions being alternately arranged in a first direction in the binary image, the binary image being disposed on a second surface of a holding member, the holding member including a first surface and the second surface provided opposite the first surface, and a storage unit that stores, in the storage unit, information indicating an association between a distance from the first measuring unit to the second surface and a contrast between the first region and the second region positioned adjacent to each other obtained as a result of the first measuring unit measuring the density levels, the process comprising:

calculating a contrast between the first region and the second region positioned adjacent to each other by using the measured density level of the first region and the measured density level of the second region; and specifying a distance corresponding to the calculated contrast by using the stored information, and detecting a deflection of the holding member in the first direction by using the specified distance as the distance from the second surface to the first region and the second region positioned adjacent to each other.

* * * * *